United States Patent
Li et al.

(10) Patent No.: US 11,501,684 B2
(45) Date of Patent: Nov. 15, 2022

(54) METHOD FOR DRIVING SILICON-BASED DRIVING BACK PLATE AND DISPLAY APPARATUS

(71) Applicant: BOE Technology Group Co., Ltd., Beijing (CN)

(72) Inventors: Shengnan Li, Beijing (CN); Wei Qin, Beijing (CN); Tieshi Wang, Beijing (CN); Xiaolong Li, Beijing (CN); Weixing Liu, Beijing (CN); Kuanjun Peng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 85 days.

(21) Appl. No.: 16/944,973

(22) Filed: Jul. 31, 2020

(65) Prior Publication Data
US 2021/0166607 A1    Jun. 3, 2021

(30) Foreign Application Priority Data
Nov. 29, 2019    (CN) .......................... 201911205418.5

(51) Int. Cl.
*G09G 3/20*    (2006.01)
*G09G 3/3266*    (2016.01)

(52) U.S. Cl.
CPC ......... *G09G 3/2007* (2013.01); *G09G 3/3266* (2013.01); *G09G 2310/0243* (2013.01); *G09G 2320/0686* (2013.01); *G09G 2354/00* (2013.01)

(58) Field of Classification Search
CPC ...... G09G 3/20; G09G 3/2003; G09G 3/2007; G09G 3/3266; G09G 2310/0243; G09G 2320/0271; G09G 2320/0686; G09G 2354/00
USPC .......................................................... 345/691
See application file for complete search history.

(56) References Cited

U.S. PATENT DOCUMENTS

2016/0351099 A1* 12/2016 Kim ..................... G09G 3/2044
2019/0355332 A1* 11/2019 Knez ....................... G09G 3/20

* cited by examiner

*Primary Examiner* — Amare Mengistu
*Assistant Examiner* — Gloryvid Figueroa-Gibson
(74) *Attorney, Agent, or Firm* — ArentFox Schiff LLP; Michael Fainberg

(57) ABSTRACT

Disclosed are a method for driving a silicon-based driving back plate and a display apparatus. The method includes: acquiring a watch position of a user on the silicon-based driving back plate within one frame time; determining a watch region of the user on the silicon-based driving back plate according to the watch position; and controlling a sum of an analog modulation bit for analog scanning charging and a digital modulation bit for digital scanning charging performed on each row of pixels in the watch region to be greater than a sum of an analog modulation bit for analog scanning charging and a digital modulation bit for digital scanning charging performed on each row of pixels in a non-watch region.

15 Claims, 3 Drawing Sheets

METHOD FOR DRIVING SILICON-BASED DRIVING BACK PLATE AND DISPLAY APPARATUS

CROSS-REFERENCE TO RELATED APPLICATION

This application claims priority of Chinese Patent Application No. 201911205418.5, filed on Nov. 29, 2020, which is hereby incorporated by reference in its entirety.

FIELD

The present disclosure relates to the technical field of silicon-based micro-displaying, and in particular, a method for driving a silicon-based driving back plate for smart display, and a display apparatus.

BACKGROUND

Silicon-based micro display is constantly developing in the direction of high resolution, high gray level, and high refresh rate. An existing silicon-based micro display gray-scale modulation technology can be divided into analog amplitude modulation and digital pulse width modulation. In the analog amplitude modulation method, a micro display system requires a pixel gray-scale modulation circuit to generally need a larger capacitor to save a pixel voltage. As the display resolution and the refresh rate increase, a pixel capacitor is required to have a higher charge and discharge speed, and a digital-to-analog converter is required to have higher resolution and a higher signal conversion speed, and it is ensured that an analog quantity has sufficiently high precision. Compared with the analog amplitude modulation, digital scanning uses a pulse width to modulate the brightness, is high in scanning accuracy and progress, low in image noise, stable in picture quality and high in gray level, and has relatively low requirements for circuit characteristics.

SUMMARY

A method for driving a silicon-based driving back plate provided by the embodiments of the present disclosure includes:
  acquiring a watch position of a user on the silicon-based driving back plate within one frame time;
  determining a watch region of the user on the silicon-based driving back plate according to the watch position; and controlling a sum of an analog modulation bit for analog scanning charging and a digital modulation bit for digital scanning charging performed on each row of pixels in the watch region to be greater than a sum of an analog modulation bit for analog scanning charging and a digital modulation bit for digital scanning charging performed on each row of pixels in a non-watch region.

In some embodiments, the controlling the sum of the analog modulation bit for analog scanning charging and the digital modulation bit for digital scanning charging performed on each row of pixels in the watch region to be greater than the sum of the analog modulation bit for analog scanning charging and the digital modulation bit for digital scanning charging performed on each row of pixels in the non-watch region includes:
  controlling the analog modulation bits for analog scanning charging performed on each row of pixels in the watch region and the non-watch region to be same, and controlling the digital modulation bit for digital scanning charging performed on each row of pixels in the watch region to be greater than the digital modulation bit for digital scanning charging performed on each row of pixels in the non-watch region.

In some embodiments, the controlling the digital modulation bit for digital scanning charging performed on each row of pixels in the watch region to be greater than the digital modulation bit for digital scanning charging performed on each row of pixels in the non-watch region includes:
  controlling the digital modulation bit for digital scanning charging performed on each row of pixels in the watch region to be an integral multiple of the digital modulation bit for digital scanning charging performed on each row of pixels in the non-watch region.

In some embodiments, the method further includes controlling a quantity of digital scanning charging performed on each row of pixels in the watch region to be greater than a quantity of digital scanning charging performed on each row of pixels in the non-watch region.

In some embodiments, the quantity of digital scanning charging performed on each row of pixels in the watch region is an integral multiple of the quantity of digital scanning charging performed on each row of pixels in the non-watch region.

In some embodiments, the method further includes staggering a time node of performing the analog scanning charging on each row of pixels in the watch region and a time node of performing the analog scanning charging on each row of pixels in the non-watch region, or staggering a time node of performing the digital scanning charging on each row of pixels in the watch region and a time node of performing the digital scanning charging on each row of pixels in the non-watch region.

In some embodiments, within one frame time, a duration of the analog scanning charging performed on each row of pixels in the watch region is used as a reference duration; a duration of a first digital scanning charging is 8 times the reference duration; a duration of a second digital scanning charging is twice the reference duration; a duration of a third digital scanning charging is equal to the reference duration; and a duration of a fourth digital scanning charging is 4 times the reference duration.

In some embodiments, within one frame time, a duration of the analog scanning charging performed on each row of pixels in the non-watch region is used as a reference duration; a duration of a first digital scanning charging is equal to the reference duration; and a duration of a second digital scanning charging is twice the reference duration.

In some embodiments, the silicon-based driving back plate is divided into a plurality of sub-regions in advance by taking a pixel row as a unit, and the determining the watch region of the user on the silicon-based driving back plate according to the watch position includes: determining the sub-region with the watch position as the watch region of the user on the silicon-based driving back plate.

Based on the same inventive idea, some embodiments of the present disclosure further disclose a display apparatus, including: a memory and a processor, wherein the memory is configured to store a computer readable program, the processor is configured to execute the computer readable program to implement the method according to above embodiments.

DETAILED DESCRIPTION OF THE EMBODIMENTS

Figure 1:
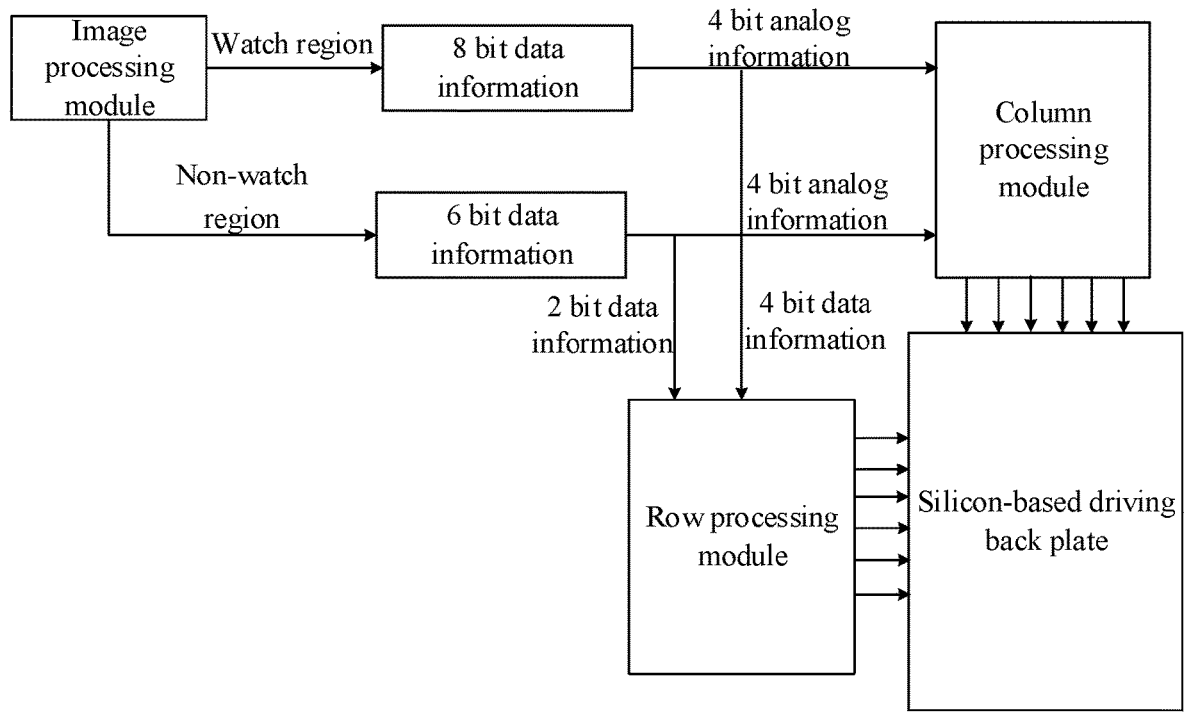
FIG. 1 is a schematic block diagram of a display apparatus provided by some embodiments of the present disclosure for smart display.

In order to make the objectives, technical solutions and advantages of the embodiments of the present disclosure clearer, the technical solutions in the embodiments of the present disclosure are described clearly and completely below in conjunction with the drawings in the embodiments of the present disclosure. Obviously, the described embodiments are a part of the embodiments of the present disclosure, not all the embodiments. Based on the described embodiments of the present disclosure, all other embodiments obtained by those of ordinary skill in the art without creative work shall fall within the protection scope of the present disclosure. Unless otherwise defined, technical terms or scientific terms used here shall be ordinary meanings as understood by those ordinarily skilled in the art of the present disclosure.

A method for driving a silicon-based driving back plate provided by embodiments of the present disclosure includes the following steps.

A watch position of a user on the silicon-based driving back plate is acquired.

A watch region of the user on the silicon-based driving back plate is determined according to the watch position.

A sum of an analog modulation bit for analog scanning charging and a digital modulation bit for digital scanning charging performed on each row of pixels in the watch region is controlled to be greater than a sum of an analog modulation bit for analog scanning charging and a digital modulation bit for digital scanning charging performed on each row of pixels in a non-watch region.

In some embodiments, the display gray-scale level is $2^{m+n}$ being the analog modulation bit and n being the digital modulation bit; therefore, the sum of the analog modulation bit for analog scanning charging and the digital modulation bit for digital scanning charging performed on each row of pixels in the watch region is controlled to be greater than the sum of the analog modulation bit for analog scanning charging and the digital modulation bit for digital scanning charging performed on each row of pixels in the non-watch region to cause the display gray-scale level of each row of pixels in the watch region to be greater than that of each row of pixels in the non-watch region, that is, the gray-scale resolution of each row of pixels in the watch region is higher than that of each row of pixels in the non-watch region. Furthermore, in consideration of the characteristics of the macular regions of human eyes, the watch region can be watched at a high definition only. In the present disclosure, intelligent regional driving is performed on each row of pixels of the silicon-based driving back plate by referring to the characteristics of the macular regions of human eyes, so that the front-end data flow is effectively reduced without affecting the visual experience, which is favorable for realizing high refresh rate and high resolution. With reference to the resolution 1920*1080 and the refresh rate 60 Hz, the front-end data flow of the present disclosure is about 2.8 Gbps, which is reduced by about 22%.

It should be noted that the driving method provided by embodiments of the present disclosure is not only applicable to a silicon-based micro display, but also applicable to an X-ray detector. No specific limitations are made here. Furthermore, in order to facilitate understanding the technical solutions of the present disclosure, the following is described by taking the application of the driving method to a silicon-based display for example.

Alternatively, in some embodiments, the step that the sum of the analog modulation bit for analog scanning charging and the digital modulation bit for digital scanning charging performed on each row of pixels in the watch region is controlled to be greater than the sum of the analog modulation bit for analog scanning charging and the digital modulation bit for digital scanning charging performed on each row of pixels in the non-watch region may be specifically realized through the following method:

the analog modulation bits for analog scanning charging performed on each row of pixels in the watch region and the non-watch region are controlled to be the same, and the digital modulation bit for digital scanning charging performed on each row of pixels in the watch region is controlled to be greater than the digital modulation bit for digital scanning charging performed on each row of pixels in the non-watch region.

The analog modulation bits for analog scanning charging performed on each row of pixels in the watch region and the non-watch region are controlled to be the same to cause each row of pixels in the watch region and the non-watch region may share one digital-to-analog converter (DAC), thus simplifying the circuit structure. Furthermore, compared with a scanning mode that separately adopts analog amplitude modulation, a digital-analog fused scanning mode in the present disclosure effectively reduces the modulation bit and a resolution requirement of the DAC under the condition of displaying the same gray-scale resolution.

For example, as shown in FIG. 1, the watch position of the user on the silicon-based driving back plate may be acquired through an image processing module (such as a charge coupled device (CCD) image sensor), and the watch region of the user on the silicon-based driving back plate is determined according to the watch position; and then, 4 bit analog information is loaded to each row of pixels in the watch region and the non-watch region respectively through a column processing module (at least including the DAC), and 4 bit digital information is loaded to each row of pixels in the watch region and 2 bit digital information is loaded to each row of pixels in the non-watch region through a row processing module (at least including a gate driving circuit and a source driving circuit), so that the watch region realizes 256 gray-scale displaying, and the non-watch region realizes 64 gray-scale displaying.

Alternatively, in some embodiments, the step that the digital modulation bit for digital scanning charging performed on each row of pixels in the watch region is controlled to be greater than the digital modulation bit for digital scanning charging performed on each row of pixels in the non-watch region may be specifically realized through the following method: the digital modulation bit for digital scanning charging performed on each row of pixels in the watch region is controlled to be an integral multiple of the digital modulation bit for digital scanning charging performed on each row of pixels in the non-watch region.

For example, the digital modulation bit for digital scanning charging performed on each row of pixels in the watch region is controlled to be twice the digital modulation bit for digital scanning charging performed on each row of pixels in the non-watch region. Of course, the digital modulation bit for digital scanning charging performed on each row of pixels in the watch region is other multiples of the digital modulation bit for digital scanning charging performed on each row of pixels in the non-watch region, which may be specifically set according to an actual requirement and is not limited here.

Alternatively, in some embodiments, the number of digital scanning charging performed on each row of pixels in the watch region is controlled to be greater than the number of digital scanning charging performed on each row of pixels in the non-watch region.

The characteristic of high refresh rate can be realized based on the silicon-based driving back plate. Within one frame time, each row of pixels are charged for many times to cause the power-on retention time of a capacitor in a pixel circuit to be shortened. For the design, an area required by the capacitor is reduced, which is more favorable for realizing micro display. Furthermore, since the number of digital scanning charging performed on each row of pixels in the watch region is greater than the number of digital scanning charging performed on each row of pixels in the non-watch region, each pixel of the watch region may realize any gray-scale level between L0 and L255, and each pixel of the non-watch region may realize partial gray-scale levels between L0 and L255 only. Based on this, the display effect of the watch region is better than the display effect of the non-watch region, which is favorable for improving the watch experience.

Alternatively, in some embodiments, the number of digital scanning charging performed on each row of pixels in the watch region is controlled to be an integral multiple of the number of digital scanning charging performed on each row of pixels in the non-watch region.

For example, the number of digital scanning charging performed on each row of pixels in the watch region may be controlled to be twice the number of digital scanning charging performed on each row of pixels in the non-watch region. Of course, the number of digital scanning charging performed on each row of pixels in the watch region may also be controlled to be other multiples of the number of digital scanning charging performed on each row of pixels in the non-watch region. A specific number may be set according to an actual requirement, which is not limited here.

Alternatively, in some embodiments, time nodes of performing the analog scanning charging or the digital scanning charging on each row of pixels in the watch region and the non-watch region are staggered mutually.

Since each row of pixels of the watch region and the non-watch region share the gate driving circuit, the source driving circuit, the DAC and other driving elements, the time nodes of performing the analog scanning charging or the digital scanning charging on each row of pixels in the watch region and the non-watch region are controlled to be staggered mutually, which avoids mutual interference during the analog scanning charging or the digital scanning charging performed on each row of pixels of the watch region and the non-watch region.

Alternatively, in some embodiments, within one frame time, a duration of the analog scanning charging performed on each row of pixels in the watch region is used as a reference duration; a duration of the first digital scanning charging is 8 times of the reference duration; a duration of the second digital scanning charging is twice the reference duration; a duration of the third digital scanning charging is equal to the reference duration; and a duration of the fourth digital scanning charging is 4 times of the reference duration.

Alternatively, in some embodiments, within one frame time, a duration of the analog scanning charging performed on each row of pixels in the non-watch region is used as a reference duration; a duration of the first digital scanning charging is equal to the reference duration; and a duration of the second digital scanning charging is twice the reference duration.

Alternatively, in some embodiments, the silicon-based driving back plate is divided into a plurality of sub-regions in advance by taking a pixel row as a unit, and the step that the watch region of the user on the silicon-based driving back plate is determined according to the watch position may be realized through the following method:

the sub-region with the watch position is determined as the watch region of the user on the silicon-based driving back plate.

Of course, in some embodiments, the watch region of the user on the silicon-based driving back plate may also be determined according to the watch position through other methods. For example, it is determined that a pixel row spaced from the watch position at a preset distance is the watch region of the user on the silicon-based driving back plate, and this is not limited here.

The above method provided by the present disclosure will be described below in detail through a following embodiment.

Figure 2:
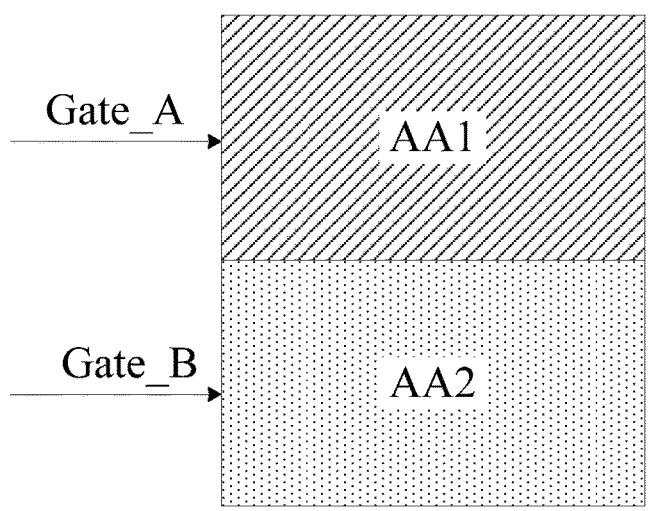
FIG. 2 is a schematic diagram of a row control signal and a driving region provided by some embodiments of the present disclosure.
Figure 3:
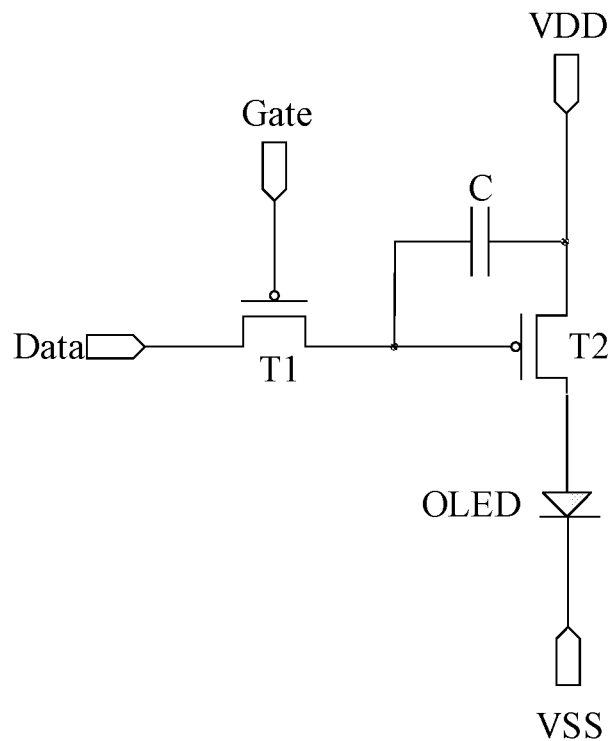
FIG. 3 is a schematic structural diagram of a pixel circuit provided by some embodiments of the present disclosure.

Alternatively, FIG. 2 is taken as an example. A display region is divided into two sub-regions AA1 and AA2 by taking a pixel row as a unit. The watch position of the user on the silicon-based driving back plate may be acquired through the image processing module as shown in FIG. 1 (such as the CCD image sensor), and the sub-region with the watch position is determined as the watch region of the user on the silicon-based driving back plate. The following will describe AA1 regarded as a watch region and AA2 regarded as a non-watch region. The pixel circuit is of a traditional 2T1C structure including two transistors and one capacitor, as shown in FIG. 3. Optionally, the pixel circuit shown in FIG. 3 includes a switching transistor T1, a driving transistor T2 and a storage capacitor C. The gate of the switching transistor T1 is coupled to a gate line Gate, and the first electrode is coupled to a data line Data; the first electrode of the driving transistor T2 is coupled to a high-level power end VDD, and the second electrode is coupled to the input end of a luminescent device OLED; the storage capacitor C is coupled between the second electrode of the switching transistor T1 and the gate of the driving transistor T2.

Based on the characteristics of the macular regions of human eyes, the watch region is subjected to high-gray-scale displaying, and the non-watch region is subjected to low-gray-scale displaying, so as to realize smart display. For example, the column processing module shown in FIG. 1 (at least including the DAC) loads an analog gray voltage with a modulation bit of 4 (i.e., 4 bit) to each row of pixels of the watch region and each row of pixels of the non-watch region, and the row processing module shown in FIG. 1 (at least including the gate driving circuit and the source driving circuit) loads a digital gray voltage with a modulation bit of 4 (i.e., 4 bit) to each row of pixels of the watch region, and loads a digital gray voltage with a modulation bit of 2 (i.e., 2 bit) to each row of pixels of the non-watch region, thereby causing the watch region to realize 256 gray-scale displaying and the non-watch region to realize 64 gray-scale displaying.

Figure 4:
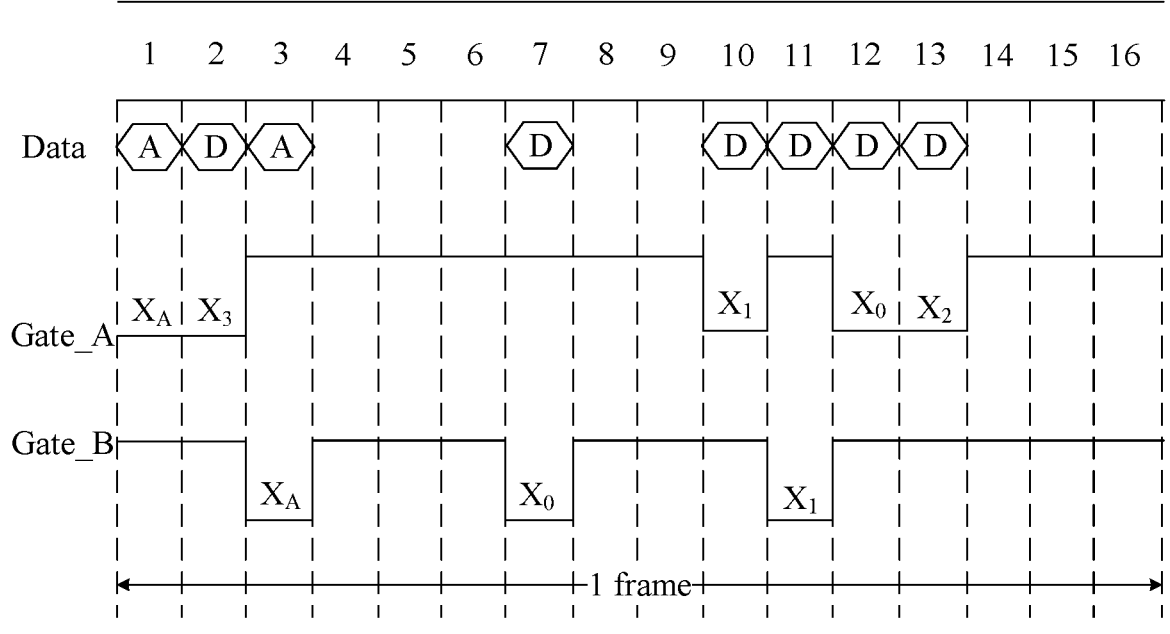
FIG. 4 is a work time sequence diagram of a silicon-based driving back plate provided by some embodiments of the present disclosure.

In an actual working process, as shown in FIG. 4, one frame time is divided into 16 pieces of sub-time. Gate_A represents a row control signal of the watch region; Gate_B represents a row control signal of the non-watch region; $X_N$ (N=0, 1, 2, 3) represents the start of digital scanning; D represents a digital gray voltage, and a D value is $V_{min}$ or $V_{max}$; $X_A$ represents the start of analog scanning; and A represents an analog gray voltage, and a value range of A is $[V_{min}, V_{max}]$.

The watch region is controlled to be displayed at a 256 gray-scale resolution, including followings:
  one frame time is divided into 16 pieces of sub-time in advance;
  at the first sub-time, a scanning start signal (i.e., a low level of Gate_A) is applied to each scanning line of the watch region in sequence, and a 4 bit analog gray voltage is applied to each data line, so that a retention duration of the written analog gray voltage is equal to 1 piece of sub-time;
  at the second sub-time, the scanning start signal (i.e., the low level of Gate_A) is constantly applied to each scanning line of the watch region in sequence, and a 4 bit digital gray voltage is applied to each data line; at the third to ninth sub-time, a scanning end signal (i.e., a high level of Gate_A) is applied to each scanning line of the watch region in sequence, so that the retention duration of the digital gray voltage written at the first time is equal to 8 pieces of sub-time;
  at the tenth sub-time, the scanning start signal (i.e., the low level of Gate_A) is applied to each scanning line of the watch region in sequence, and a 4 bit digital gray voltage is applied to each data line; at the eleventh sub-time, the scanning end signal (i.e., the high level of Gate_A) is applied to each scanning line of the watch region in sequence, so that the retention duration of the digital gray voltage written at the second time is equal to 2 pieces of sub-time;
  at the twelfth sub-time, a scanning start signal (i.e., the low level of Gate_A) is applied to each scanning line of the watch region, and a 4 bit digital gray voltage is applied to each data line, so that a retention duration of the digital gray voltage written at the third time is equal to 1 piece of sub-time;
  at the thirteenth sub-time, the scanning start signal (i.e., the low level of Gate_A) is applied to each scanning line of the watch region in sequence, and a 4 bit digital gray voltage is applied to each data line; at the fourteenth to sixteenth sub-time, the scanning end signal (i.e., the high level of Gate_A) is applied to each scanning line of the watch region in sequence, so that the retention duration of the digital gray voltage written at the fourth time is equal to 4 pieces of sub-time.

It can be known from the above description that for the watch region modulated by 256 gray scales, it is subjected to analog scanning charging once within one frame time, and a corresponding sub-time weight is 1/16; and it is subjected to digital scanning charging for 4 times, and a corresponding sub-time weight is (1+2+4+8)/16, i.e., 15/16. The time for analog scanning charging may be blanking time. a voltage value V applied to the pixels in the watch region is expressed as:

$$V = \frac{1}{T}\left[\left(\int V(SF_N) \cdot TD \cdot dSF_N\right) + V(Lb) \cdot TA\right].$$

$SF_N$ is a serial number of digital sub-time; TD is single digital sub-time; TA is analog sub-time; T is one frame time; V(Lb) is the analog gray voltage; and $V(SF_N)$ is the digital gray voltage.

The step that the non-watch region is controlled to be displayed at the 64 gray-scale resolution includes that:
  one frame time is divided into 16 pieces of sub-time in advance;
  at the third sub-time, a scanning start signal (i.e., a low level of Gate_B) is applied to each scanning line of the non-watch region in sequence, and a 4 bit analog gray voltage is applied to each data line; at the fourth to sixth sub-time, a scanning end signal (i.e., a high level of Gate_B) is applied to each scanning line of the non-watch region in sequence, so that the retention duration of the written analog gray voltage is equal to 4 pieces of sub-time;
  at the seventh sub-time, the scanning start signal is applied to each scanning line of the non-watch region in sequence, and a 2 bit digital gray voltage is applied to each data line for the first time; at the eighth to tenth sub-time, the scanning end signal (i.e., the high level of Gate_B) is applied to each scanning line of the non-watch region in sequence, so that the retention duration of the digital gray voltage written at the first time is equal to 4 pieces of sub-time;
  at the eleventh sub-time, the scanning start signal is applied to each scanning line of the non-watch region in sequence, and a 2 bit digital gray voltage is applied to each data line for the second time; at the twelfth to sixteenth sub-time, the first sub-time and the second sub-time, the scanning end signal (i.e., the high level of Gate_B) is applied to each scanning line of the non-watch region in sequence, so that the retention duration of the digital gray voltage written at the second time is equal to 8 pieces of sub-time.

It can be known from the above description that for the non-watch region modulated by 64 gray scales, it is subjected to analog scanning charging once within one frame time, and a corresponding sub-time weight is 4/16, i.e., 1/4; and it is subjected to digital scanning charging twice, and a corresponding sub-time weight is (4+8)/16, i.e., 3/4. The time for analog scanning charging may be blanking time. A voltage value V applied to the pixels in the non-watch region is expressed as:

$$V = \frac{1}{T}\left[\left(\int V(SF_N) \cdot TD \cdot dSF_N\right) + V(Lb) \cdot TA\right].$$

$SF_N$ is a serial number of digital sub-time; TD is single digital sub-time; TA is analog sub-time; T is one frame time; V(Lb) is the analog gray voltage; and $V(SF_N)$ is the digital gray voltage.

Figure 5:
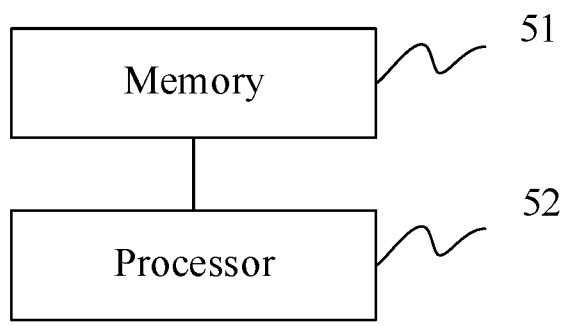
FIG. 5 is a schematic block diagram of a display apparatus provided by another embodiments of the present disclosure.

Based on the same inventive idea, some embodiments of the present disclosure further provide a display apparatus. As shown in FIG. 5, the display apparatus includes a memory 51 and a processor 52. The memory 51 is configured to store a computer readable program. The processor 52 is configured to read the computer readable program to implement the method according to above embodiments, and the repetition will not be repeated here.

The method for driving the silicon-based driving back plate and the display apparatus disclosed by the present disclosure include: acquiring the watch position of the user on the silicon-based driving back plate within one frame time; determining the watch region of the user on the silicon-based driving back plate according to the watch position; and controlling the sum of the analog modulation bit for analog scanning charging and the digital modulation bit for digital scanning charging performed on each row of pixels in the watch region to be greater than the sum of the analog modulation bit for analog scanning charging and the digital modulation bit for digital scanning charging performed on each row of pixels in the non-watch region. The display gray-scale level is $2^{m+n}$ being the analog modulation bit and n being the digital modulation bit; therefore, the sum of the analog modulation bit for analog scanning charging and the digital modulation bit for digital scanning charging performed on each row of pixels in the watch region is controlled to be greater than the sum of the analog modulation bit for analog scanning charging and the digital modulation bit for digital scanning charging performed on each row of pixels in the non-watch region to cause the display gray-scale level of each row of pixels in the watch region to be greater than that of each row of pixels in the non-watch region, that is, the gray-scale resolution of each row of pixels in the watch region is higher than that of each row of pixels in the non-watch region. Furthermore, in consideration of the characteristics of the macular regions of human eyes, the watch region can be watched at a high definition only. In the present disclosure, intelligent regional driving is performed on each row of pixels of the silicon-based driving back plate by referring to the characteristics of the macular regions of human eyes, so that the front-end data flow is effectively reduced without affecting the visual experience, which is favorable for realizing high refresh rate and high resolution.

Obviously, those skilled in the art can make various changes and modifications to the present disclosure without departing from the spirit and scope of the present disclosure. Therefore, if these changes and transformations of the present disclosure fall within the scope of the claims of the present disclosure and equivalent technologies of the present disclosure, the present disclosure is intended to include these changes and transformations.

What is claimed is:

1. A method for driving a silicon-based driving back plate, comprising:
    acquiring a watch position of a user on the silicon-based driving back plate within one frame time;
    determining a watch region of the user on the silicon-based driving back plate according to the watch position; and
    controlling a sum of an analog modulation bit for analog scanning charging performed on each row of pixels and a digital modulation bit for digital scanning charging performed on each row of pixels in the watch region to be greater than a sum of an analog modulation bit for analog scanning charging performed on each row of pixels and a digital modulation bit for digital scanning charging performed on each row of pixels in a non-watch region;
    wherein the method further comprising:
    controlling a quantity of digital scanning charging performed on each row of pixels in the watch region to be greater than a quantity of digital scanning charging performed on each row of pixels in the non-watch region, wherein the quantity of digital scanning charging performed on each row of pixels refers to the number of digital scanning charging performed on each row of pixels;
    wherein the method further comprising: staggering a time node of performing the analog scanning charging on each row of pixels in the watch region and a time node of performing the analog scanning charging on each row of pixels in the non-watch region, or staggering a time node of performing the digital scanning charging on each row of pixels in the watch region and a time node of performing the digital scanning charging on each row of pixels in the non-watch region.

2. The driving method according to claim 1, wherein the controlling the sum of the analog modulation bit for analog scanning charging and the digital modulation bit for digital scanning charging performed on each row of pixels in the watch region to be greater than the sum of the analog modulation bit for analog scanning charging and the digital modulation bit for digital scanning charging performed on each row of pixels in the non-watch region comprises:
    controlling the analog modulation bit for analog scanning charging performed on each row of pixels in the watch region and the non-watch region to be same, and controlling the digital modulation bit for digital scanning charging performed on each row of pixels in the watch region to be greater than the digital modulation bit for digital scanning charging performed on each row of pixels in the non-watch region.

3. The driving method according to claim 2, wherein the controlling the digital modulation bit for digital scanning charging performed on each row of pixels in the watch region to be greater than the digital modulation bit for digital scanning charging performed on each row of pixels in the non-watch region comprises:
    controlling the digital modulation bit for digital scanning charging performed on each row of pixels in the watch region to be an integral multiple of the digital modulation bit for digital scanning charging performed on each row of pixels in the non-watch region.

4. The driving method according to claim 1, wherein the quantity of digital scanning charging performed on each row of pixels in the watch region is an integral multiple of the quantity of digital scanning charging performed on each row of pixels in the non-watch region.

5. The driving method according to claim 1, wherein within one frame time, a duration of the analog scanning charging performed on each row of pixels in the watch region is used as a reference duration; a duration of a first digital scanning charging is 8 times the reference duration; a duration of a second digital scanning charging is twice the reference duration; a duration of a third digital scanning charging is equal to the reference duration; and a duration of a fourth digital scanning charging is 4 times the reference duration.

6. The driving method according to claim 1, wherein within one frame time, a duration of the analog scanning charging performed on each row of pixels in the non-watch region is used as a reference duration; a duration of a first digital scanning charging is equal to the reference duration; and a duration of a second digital scanning charging is twice the reference duration.

7. The driving method according to claim 1, wherein the silicon-based driving back plate is divided into a plurality of sub-regions in advance by taking a pixel row as a unit, and the determining the watch region of the user on the silicon-based driving back plate according to the watch position comprises:

determining the sub-region with the watch position as the watch region of the user on the silicon-based driving back plate.

8. A display apparatus, comprising: a memory and a processor, wherein the memory is configured to store a computer readable program, the processor is configured to execute the computer readable program to implement the method according to claim 1.

9. The display apparatus according to claim 8, wherein the processor is configured to execute the computer readable program to perform followings:

controlling the analog modulation bit for analog scanning charging performed on each row of pixels in the watch region and the non-watch region to be same, and controlling the digital modulation bit for digital scanning charging performed on each row of pixels in the watch region to be greater than the digital modulation bit for digital scanning charging performed on each row of pixels in the non-watch region.

10. The display apparatus according to claim 9, wherein the processor is configured to execute the computer readable program to perform followings:

controlling the digital modulation bit for digital scanning charging performed on each row of pixels in the watch region to be an integral multiple of the digital modulation bit for digital scanning charging performed on each row of pixels in the non-watch region.

11. The display apparatus according to claim 8, wherein the quantity of digital scanning charging performed on each row of pixels in the watch region is an integral multiple of the quantity of digital scanning charging performed on each row of pixels in the non-watch region.

12. The display apparatus according to claim 8, wherein the processor is configured to execute the computer readable program to perform followings: staggering a time node of performing the analog scanning charging on each row of pixels in the watch region and a time node of performing the analog scanning charging on each row of pixels in the non-watch region, or staggering a time node of performing the digital scanning charging on each row of pixels in the watch region and a time node of performing the digital scanning charging on each row of pixels in the non-watch region.

13. The display apparatus according to claim 12, wherein within one frame time, a duration of the analog scanning charging performed on each row of pixels in the watch region is used as a reference duration; a duration of a first digital scanning charging is 8 times the reference duration; a duration of a second digital scanning charging is twice the reference duration; a duration of a third digital scanning charging is equal to the reference duration; and a duration of a fourth digital scanning charging is 4 times the reference duration.

14. The display apparatus according to claim 12, wherein within one frame time, a duration of the analog scanning charging performed on each row of pixels in the non-watch region is used as a reference duration; a duration of a first digital scanning charging is equal to the reference duration; and a duration of a second digital scanning charging is twice the reference duration.

15. The display apparatus according to claim 8, wherein the silicon-based driving back plate is divided into a plurality of sub-regions in advance by taking a pixel row as a unit, and the processor is configured to execute the computer readable program to perform followings:

determining the sub-region with the watch position as the watch region of the user on the silicon-based driving back plate.

\* \* \* \* \*